United States Patent [19]
Patel et al.

[11] Patent Number: 4,983,442
[45] Date of Patent: Jan. 8, 1991

[54] COMPOSITE ARTICLE AND METHOD OF MAKING SAME

[75] Inventors: Tushar M. Patel, Utica; Richard E. Berg, Port Huron, both of Mich.

[73] Assignee: United Technologies Automotive Inc., Dearborn, Mich.

[21] Appl. No.: 553,197

[22] Filed: Jul. 13, 1990

[51] Int. Cl.⁵ .................. B32B 1/04; B32B 3/02; B32B 3/26; B32B 31/00
[52] U.S. Cl. ...................... 428/74; 156/293; 428/78; 428/119; 428/138; 428/284; 428/285; 428/286; 428/304.4
[58] Field of Search .............. 428/63, 68, 74, 77, 428/78, 119, 138, 139, 284, 285, 286, 287, 304.4; 156/293

[56] References Cited
U.S. PATENT DOCUMENTS 3,130,112  4/1964  Anderson, Jr. ............... 428/186
3,868,293  2/1975  Selph ........................ 428/78
4,695,501  9/1987  Robinson ..................... 428/287

Primary Examiner—William J. Van Balen

[57] ABSTRACT

The composite article of the present invention comprises a resin binder impregnated fiberglass matte having adjacent to one or more of said matte's edges a strip of semi-rigid foam. On one or more surface of the core is bonded one or more reinforcing or decorative layers. Further disclosed is the method for making these composite articles.

11 Claims, 1 Drawing Sheet

U.S. Patent                    Jan. 8, 1991                    4,983,442
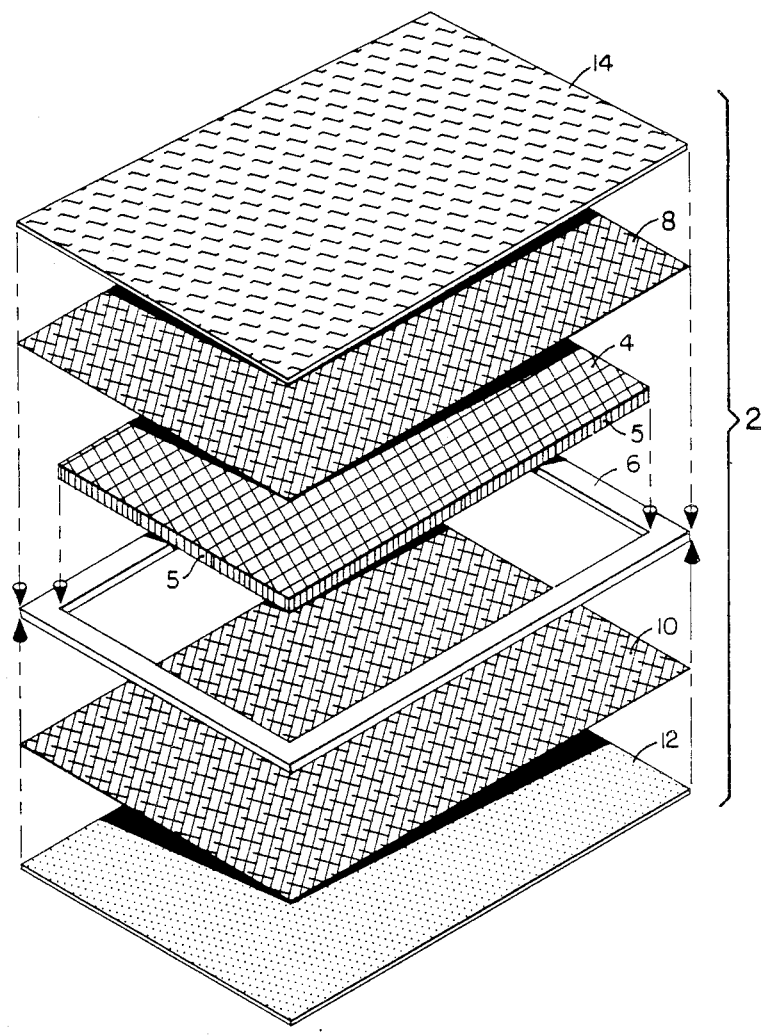

COMPOSITE ARTICLE AND METHOD OF MAKING SAME

TECHNICAL FIELD

The present invention relates to composite articles, particularly composite articles comprising fiberglass and foam. Additionally, it relates to interior trim composite articles useful in the manufacture of automobiles.

BACKGROUND OF THE INVENTION

Composite trim panels of fiberglass, foam or other materials are used in the manufacture of automobiles to enhance the aesthetics of the interior of the car. Such trim products are headliners, door panels and the like. In addition to decoratively covering the interior sheet metal, these components reduce the noise levels inside the automobile cab by acting as noise absorbers. The objective of manufacturers of these products has been and still is to produce a product which is simple, inexpensive and safe to manufacture, but which is lightweight and self-supporting.

In the past, these components have been manufactured from resin bonded fiberglass or foam materials. These compositions would be used as the core of the article upon which reinforcing materials and decorative layers would be bonded to produce the unitary composite structure. However, the processes used for the manufacture of these products does not result in a product having the required actual dimensions required to meet the automotive manufacturers specification (net shape). This means that post formation cutting is required This is not a problem where fiberglass is not a principal constituent. However, when fiberglass is a primary material, the exposed edges of the article after being cut to the net shape result in exposed fiberglass material. This presents handling and environmental problems for the manufacturers as well as the ultimate user of the product.

Therefore, what is needed in this art is a composite article which meets all of the industries needs regarding the physical properties of the resulting composite article but which uses fiberglass material in such a way that the method of manufacture results in a composite article having no exposed fiberglass.

DISCLOSURE OF THE INVENTION

The present invention teaches a method for manufacturing a laminate composite article comprising a core of a fiberglass matte impregnated with a thermosetting resin binder and adjacent to at least one side of the matte a strip of semi-rigid urethane foam. The core having one or more reinforcing layers bonded to at least one of the core surfaces.

Further, disclosed is the composite article formed from the method.

BRIEF DESCRIPTION OF THE DRAWINGS

The Figure represents an exploded view of a composite article of the present invention.

THE BEST MODE OF PRACTICING THE INVENTION

As may be seen from the Figure, the composite article 2 of the present invention comprises a fiberglass matte 4 having adjacent to its edges (side surfaces) 5 a foam strip 6. This foam strip may be in the form of a frame surrounding the edges 5 of the fiberglass matte 4 (as depicted here) or it may be one or more strips adjacent to one or more of the matte's edges 5 forming the core structure. Further, reinforcing layers 8 and 10 may be applied on the top and bottom of the core structure. Additionally, a scrim 12 and a decorative layer 14 may also be applied to the core structure. In addition, the fiberglass matte contains an adhesive resin distributed throughout the material. Additional adhesive may be applied between the individual layers to assist in bonding these layers together during processing to form the unitary article.

The fiberglass matte useful in the practice of this invention may be any of the conventional fiberglass matte constructions now used to manufacture headliners for automobiles. Typically, these materials are nonwoven, lofted fiberglass blankets having excellent acoustical properties Such fiberglass products are known to the industry and are readily available from Manville Corporation. These blankets are characterized as having a relatively thick layer of fiberglass fibers about 2 inches to about 8 inches in length loosely layered onto a supporting thin scrim support. The scrim support may be a non-woven polyester material or the like, similar to the reinforcing scrim applied later in this invention. The resulting fiberglass matte is typically about 3 inches in thickness and may have a density of about 600 to about 1200 grams per square meter. The preferred density being about 800 to about 900 grams per square meter with the most preferred having a density of about 820 grams per square meter.

The fiberglass matte should have a thermosetting resin binder system distributed throughout the matte. Such a resin should flow and cure during the processing step resulting in bonding the fiberglass fibers together. The resin may be applied after the fiberglass matte has been formed by distributing granular resin throughout the fiber matte or preferably is applied to the individual fibers prior to forming the matte. The amount of resin placed on the fibers is not critical so long as it is sufficient to bond them together with sufficient strength to maintain its integrity. Typically the resin concentration will be about 100 to about 130 grams per square meter with a preferred loading of about 115 to about 120 grams per square meter. The preferred resin system is a phenolic available from Plenco Corporation in Wisconsin; Borden Chemicals of Columbus, Ohio; or Chem Bond Corporation. However, other resin systems may be used such as urethane or polyester systems. All of these systems should be thermosettinq and should cure at or below the temperatures which might detrimentally effect the other materials used in the preparation of the composite article i.e., reinforcing scrims, decorative layer etc. Typically, this means the resins will flow and cure at temperatures ranging from about 200° F. to about 500° F. In addition, these systems must have sufficient shelf life so they do not cure prematurely yet are capable of accelerated curing during processing.

Abutting one or more of the edges 5 of the fiberglass matte 4 is a semi-rigid foam strip. This strip will preferably be on each edge of the core as depicted in the Figure but it may abut only one, two or three of the edges depending on the design The foam may be open cell or close cell material with open cell being preferred. In addition, although any number of foam materials may be used and would be known to those skilled in the art, the preferred material is an open cell urethane material available from FOAMEX Corporation as TF180.

The height of the foam strip will typically be the same as the height of the edge of the fiberglass matte post molding This will generally be about 3 mm to about 6 mm with the preferred being about 3 mm. In addition, the width of the strips will also vary depending on the design of the final article The strip may be almost any dimension with widths about 4 inches to about 6 inches being preferred. The foam material may be applied in individual strips to the edges of the matte or, as preferred, may be formed in the shape of a frame whereby the center of a foam sheet is removed leaving a center opening having the dimensions equal to the external dimensions of the fiberglass matte. This method is depicted in the Figure. The foam component should be positioned adjacent to and in contact with the fiberglass matte structure so that when the composite lay-up is cured, it will be securely bonded to the matte.

Further, reinforcing layers 8, 10 may be applied on either one or both surfaces of the fiberglass/foam core lay-up to improve the structural integrity of the composite. These reinforcing layers, known as veils, are non-woven, randomly oriented glass fiber mats of very fine fiber diameters. These veils may vary in grade and weight to achieve a desired physical structure. These veils generally have a density of about 75 to about 300 grams per square meter with fiber diameters from 17 to 30 microns. Some sources of these materials are NICO Fibers; CERTAIN TEED Corporation and Owens Corning Fiberglass. Further, veils of polyester fibers may also be used such as those offered by BASF Corporation located at Williamsburg, Va. commercially known as "Colback" also "Lutradur" available from Freudenburg Corporation located at Durham, N.C. Veils formed of mixtures of fiberglass and polyester fibers are also useful and such materials are available form Lydall Manning Corporation of Troy, N.Y. and are known as "Manniglas".

Another layer which may be applied to this composite lay-up is a decorative layer which, in the case of a headliner, forms an attractive decorative surface. These decorative layers would be the same layers which have been used in manufacturing conventional headliners and are known to those skilled in the art. These layers are typically formed of napped nylon knit bonded to polyurethane foam material, although other types of material compatible with the curing process may be used. Typically, the decorative layer is placed on top of the composite lay-up and is adhesively bonded during the curing and molding process. However, it may also be possible to prepare the composite article without the decorative layer and apply it to the cured composite article using an adhesive.

In addition to this foam core structure, a scrim layer, which acts as a mold release layer for the article, may be placed on one or both outer surfaces of the composite lay-up so that it is positioned between the composite lay-up and the mold. These scrims are typically very thin and are known to those skilled in the molding art. They are available from such sources as Sterns and Foster of Cincinnati, Ohio and Nolar Industries of Concord, Ontario.

The composite article of the present invention may be manufactured by preparing the fiberglass matte and the foam component to the proper dimensions. Placing the foam in position against the edge or edges of the fiberglass matte. The reinforcing layers may be stacked on either side of the core structure with further adhesive layers positioned between each reinforcing layer. The adhesive may be applied by spraying a thin layer of the adhesive on the surface or applying a layer of a thin film adhesive between the individual layers, thus forming a preform.

The preform is then placed in the appropriate mold to shape and cure, under heat and pressure, the unitary composite article. Naturally, the pressures and temperatures used to form the composite will vary with the materials and the adhesive used however, generally the pressure will range from about 12 psia to about 35 psia, with a preferred range being 20 psia to 24 psia.

The temperature range again will be a function of the material and the types of adhesive and for those suggested herein it will likely range from about 240° F. to about 320° F. The critical limitation in the temperature will likely be whether or not the preform contains the decorative layer as usually this component is the most sensitive to temperature.

It should be pointed out that the lay-up of the preform can take place right in the mold itself if desired.

Once the preform has been cured and shaped in the mold, it is removed and cut to the proper dimensions.

The advantages to this present construction over those of the prior art are that this method produces a fiberglass interior trim composite without the normal problems associated with the handling of the fiberglass. The open edges of the trim composite of the current invention are foam and not fiberglass. Therefore, the products are easier to handle and easier to install.

The advantages of this composite interior trim panel over the prior art is that the exposed edges of the articles after being cut to the proper dimensions are not of fiberglass but of the foam material. This permits easier handling of the final article as well as a safer composite. Additionally, the presence of the foam material permits better molding of he composite.

Having thus described the invention, what is claimed:

1. A composite article comprising a core of fiberglass mattes impregnated with a thermoplastic resin binder having adjacent to one or more of said matte's edges a strip of semi-rigid urethane foam and having one or more reinforcing layers bonded to at least one of the core surfaces to form a unitary composite article.

2. The composite article of claim 1 wherein the semi-rigid urethane foam surrounds the edges of the core structure.

3. The composite article of claim 1 wherein the semi-rigid urethane foam strip has a thickness greater than 7 mm and a width of greater than 1 inch.

4. The composite article of claim 1 wherein the core structure has reinforcing layers on both surfaces.

5. The composite article of claims 1 & 5 wherein the reinforcing layers comprise a non-woven scrim of fiberglass.

6. The composite article of claim 1 wherein at least one of the reinforcing layers is a decorative layer.

7. The composite article of claim 6 wherein the decorative layer is foam backed.

8. A composite article useful as an automobile interior trim panel comprising a core structure of resin impregnated fiberglass, the edges of which are surrounded with a semi-rigid thermoformable urethane wherein said top and or bottom of said core has one or more reinforcing layers bonded thereto.

9. A composite preform comprising a flat core of fiberglass impregnated with a thermoplastic resin having adjacent to one or more of said matte's edges a strip of thermoformable semi-rigid urethane foam, a layer of adhesive on at least one surface of said core and one or more reinforcing layers positioned on the core surfaces having the adhesive layer, said preform capable of being formed into a unitary composite article under sufficient heat and pressure.

10. The composite preform of claim 9 wherein the core has at a minimum a non-woven scrim reinforcing layer on one surface and a layer of non-woven scrim and a decorative layer on the opposite surface.

11. A method of making a thermoformed composite article comprising:

a frame of semi-rigid urethane foam;

placing a flat thermoplastic resin impregnated fiberglass matte within the urethane frame to form a core structure;

applying an adhesive to at least one surface of the core structure;

placing one or more reinforcing layers on the adhesive coated surface;

apply sufficient heat and pressure to form the covered core structure into the desired shape and cure the adhesive.

* * * * *